United States Patent
Walther (10) Patent No.: US 10,260,878 B2
(45) Date of Patent: Apr. 16, 2019

(54) GYROSCOPE WITH SIMPLIFIED CALIBRATION AND SIMPLIFIED CALIBRATION METHOD FOR A GYROSCOPE

(71) Applicant: COMMISSARIAT A L'ENERGIE ATOMIQUE ET AUX ENERGIES ALTERNATIVES, Paris (FR)

(72) Inventor: Arnaud Walther, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 858 days.

(21) Appl. No.: 14/654,748

(22) PCT Filed: Dec. 23, 2013

(86) PCT No.: PCT/EP2013/077926
§ 371 (c)(1),
(2) Date: Jun. 22, 2015

(87) PCT Pub. No.: WO2014/102246
PCT Pub. Date: Jul. 3, 2014

(65) Prior Publication Data
US 2015/0354981 A1 Dec. 10, 2015

(30) Foreign Application Priority Data

Dec. 24, 2012 (FR) .................................... 12 62743

(51) Int. Cl.
*G01C 25/00* (2006.01)
*G01C 19/5726* (2012.01)
(Continued)

(52) U.S. Cl.
CPC ..... *G01C 19/5726* (2013.01); *G01C 19/5755* (2013.01); *G01C 19/5762* (2013.01); *G01C 25/005* (2013.01)

(58) Field of Classification Search
CPC ............ G01C 19/5755; G01C 19/5762; G01C 19/5719; G01C 25/005; G01P 15/08; G01P 2015/0808
See application file for complete search history.

(56) References Cited

U.S. PATENT DOCUMENTS 6,209,383 B1   4/2001  Mueller et al.
7,464,590 B1   12/2008 Hotelling et al.
(Continued)

FOREIGN PATENT DOCUMENTS

CN    1954189 A    4/2007
CN    100533062 C  8/2009
(Continued)

OTHER PUBLICATIONS

U.S. Appl. No. 12/974,540, filed Dec. 21, 2010, 2011/0147860, Robert et al.
(Continued)

*Primary Examiner* — Erika J Villaluna
(74) *Attorney, Agent, or Firm* — Oblon, McClelland, Maier & Neustadt, L.L.P.

(57) ABSTRACT

A gyroscope including a mass capable of movement due to excitation and a mass capable of movement due to detection, a mechanism applying an excitation signal to the excitation mass in a first direction, a mechanism detecting the movement of the detection mass in a second direction orthogonal to the first direction, a mechanism detecting the movement of the excitation mass in the second direction, and a processor processing detection signals emitted by the mechanism detecting movements of the detection mass and the mechanism detecting movements of the excitation mass in the second direction, to obtain a phase bias, quadrature bias, and amplification factor.

24 Claims, 8 Drawing Sheets

(51) Int. Cl.
*G01C 19/5755* (2012.01)
*G01C 19/5762* (2012.01)

(56) References Cited

U.S. PATENT DOCUMENTS

| | | |
|---|---|---|
| 7,481,110 B2 | 1/2009 | Handrich et al. |
| 7,644,604 B2 | 1/2010 | Hotelling et al. |
| 7,673,510 B2 | 3/2010 | Hotelling et al. |
| 7,801,694 B1 | 9/2010 | Watson |
| 7,856,878 B2 | 12/2010 | Hotelling et al. |
| 8,210,023 B2 | 7/2012 | Jeanroy et al. |
| 2006/0037396 A1 | 2/2006 | Nicu et al. |
| 2007/0144255 A1 | 6/2007 | Handrich et al. |
| 2010/0179721 A1* | 7/2010 | Willard .................. G07C 5/085 701/31.4 |
| 2010/0319451 A1* | 12/2010 | Trusov ............... G01C 19/5719 73/504.12 |
| 2011/0147860 A1 | 6/2011 | Robert et al. |
| 2011/0172820 A1 | 7/2011 | Kim et al. |
| 2011/0178707 A1 | 7/2011 | Sachs et al. |
| 2012/0279299 A1 | 11/2012 | Walther et al. |
| 2013/0042683 A1 | 2/2013 | Chaumet |
| 2014/0331770 A1 | 11/2014 | Jourdan et al. |

FOREIGN PATENT DOCUMENTS

| | | |
|---|---|---|
| CN | 202119447 U | 1/2012 |
| FR | 2 953 012 | 5/2011 |
| JP | 2008190931 A * | 8/2008 ............. G01C 19/56 |
| WO | 2004 042324 | 5/2004 |
| WO | WO 2011/064016 A1 | 6/2011 |

OTHER PUBLICATIONS

U.S. Appl. No. 13/459,618, filed Apr. 30, 2012, 2012/0279299, Walther et al.

U.S. Appl. No. 14/364,348, filed Jun. 11, 2014, 2014/0331770, Jourdan et al.

Combined Office Action and Search Report dated Apr. 18, 2017 in Chinese Patent Application No. 201380067879.5 (with English translation of Office Action and English translation of categories of cited documents).

International Search Report dated Apr. 24, 2014 in PCT/EP2013/077926 filed Dec. 23, 2013.

French Search Report dated Sep. 27, 2013 in French Application 12 62743 Filed Dec. 24, 2012.

Tatar, E. et al., "Effect of Quadrature Error on the Performance of a Fully-Decoupled MEMS Gyroscope", IEEE, pp. 569-572, 2011.

Iyer, S. V., "Modeling and Simulation of Non-idealities in a Z-axis CMOS-MEMS Gyroscope", (6 Pages), Apr. 2003.

Weinberg, M. S., "Error Sources in In-Plane Silicon Tuning-Fork MEMS Gyroscopes", Journal of Microelectromechanical Systems, vol. 15, No. 3, pp. 42-54, Jun. 2006.

Merz, P. et al., "Impact of Si Drie on Vibratory MEMS Gyroscope Performance", IEEE, pp. 1187-1190, 2007.

* cited by examiner

GYROSCOPE WITH SIMPLIFIED CALIBRATION AND SIMPLIFIED CALIBRATION METHOD FOR A GYROSCOPE

TECHNICAL FIELD AND PRIOR ART

This invention relates to a MMES and/or NMES type gyroscope with simplified calibration and simplified calibration method for a gyroscope.

Gyroscopes of the MMES (MicroElectroMechanical Systems) and/or NMES (NanoElectroMechanical Systems) type are in general comprised of a mass or of a set of masses suspended and connected to the substrate and together by springs. The mass or the masses have several degrees of freedom, and are set into resonance-controlled vibration according to one of the modes, referred to as excitation mode according to a 1$^{st}$ degree of freedom. In the presence of a rotation, a Coriolis force appears and sets into vibration the mass or a portion of all of the masses according to a 2$^{nd}$ degree of freedom orthogonal to the 1$^{st}$ and corresponding to a mode referred to as detection mode.

Most gyroscopes use mechanical decouplings to separate the excitation portion from the detection portion. In case of a mechanical defect on the excitation, a movement according to the direction of detection will be generated and will affect the detection mass.

A bias exists in gyroscopes. This bias has a component Bi in phase with the Coriolis signal $\Omega$, designated as phase bias, and a quadrature component Bq, designated as quadrature bias. Through the measurement on the detection mass the following signal S is thus obtained:

$$S = (B_i + \Omega)\cos(\omega_0 t) + B_q \sin(\omega_0 t) \quad (1)$$

In the ideal case, by demodulating the signal provided by the gyroscope, the quadrature bias should be eliminated. However the demodulation is never perfect and has a phase error $\phi_{err}$ and a phase noise $\phi_{noise}$.

The demodulated signal is the following:

$$S'_{dè\ mod} = (B_i+\Omega)\cos(\phi_{err}+\phi_{noise}) + B_q \sin(\phi_{err}+\phi_{noise})$$
$$\approx B_i + B_q\phi_{err} + \Omega + B_q\phi_{noise}$$

The quadrature bias therefore causes a bias component in the demodulated signal and a noise component to appear.

Consequently, the quadrature bias cannot be eliminated.

The presence of this bias is due to technological defects during the realisation of the gyroscope.

The main defect is a non-diagonal stiffness coefficient $k_{xy}$, which generates the quadrature bias. In the framework of an excitation mode in the plane and of a detection mode in the plane, the gyroscope then being designated as "gyroscope Z", as it makes it possible to detect the rotations about the axis outside of the plane, this quadrature bias is in particular due to local variations in over-etching of the excitation springs. This phenomenon is described in documents S. V. Iyer, "*Modeling and simulation of non-idealities in a Z-axis CMOS-MMES gyroscope*", Ph.D. dissertation, Dept. Elect. and Comp Eng., Carnegie Mellon Univ., Pittsburgh, Pa., 2003, and E. Tatar, S. E. Alper, T. Akin, "*Effect of quadrature error on the performance of a fully decoupled MMES gyroscope*", Proc. IEEE MMES 2011, Cancun, MEXICO, Jan. 23-27, 2011, pp. 569-572.

In the framework of an excitation mode in the plane and of a detection mode outside of the plane, the gyroscope then being designated as "gyroscope X or Y, this bias is in particular due to the etching angle of the excitation springs. This phenomenon is described in documents P. Merz, W. Pilz, F. Senger, K. Reimer, M. Grouchko, T. Pandhumsoporn, W. Bosch, A. Cofer, S. Lassig, "*Impact of DRIE on Vibratory MMES gyroscope performances*", Proc. Transducers&Eurosensors 2007, Lyons, France, Jun. 10-14, 2007 pp. 1187-1190, and M. S. Weinberg, A. Kourepenis, "Error sources in in-plane silicon tuning fork MMES gyroscopes", *Journal of Microelectromechanical Systems*, vol. 15, no. 3, pp. 42-54, June 2006.

This quadrature bias results in a movement of excitation that is not perfectly collinear with the axis of excitation.

A non-diagonal damping coefficient $c_{xy}$ and a direct excitation of the detection mode by the excitation electrodes $F_{exc}{}^y$ can also be a source of bias, either in phase or in quadrature.

As indicated hereinabove, most gyroscopes implement an excitation mass and a detection mass. In case of a mechanical defect on the excitation mass, a movement according to the direction of detection will be generated and will affect the detection mass.

The equations of the excitation mass and detection mass system are the following:

$$m\ddot{x} + c_x\dot{x} + k_x x = F_{exc}$$

$$y_1 = y_{1q} + y_{1i} = \alpha x + \beta \dot{x}$$

$$m_2 \ddot{y}_2 + c_{y2}\dot{y}_2 + k_{y2}(y_2 - y_1) = 2m_2 \dot{x}\Omega$$

$$Y_{2q} = \frac{Y_{1q}}{1 - \left(\frac{\omega_{0exc}}{\omega_{0det}}\right)^2 + i\frac{\omega_{0exc}}{Q_{det}\omega_{0det}}},$$

$$Y_{2i} = \frac{Y_{1i}}{1 - \left(\frac{\omega_{0exc}}{\omega_{0det}}\right)^2 + i\frac{\omega_{0exc}}{Q_{det}\omega_{0det}}}$$

$$\frac{Y_\Omega}{\Omega} = \frac{2i\omega_{0exc}X}{\omega_{0det}^2\left(1 - \left(\frac{\omega_{0exc}}{\omega_{0det}}\right)^2 + i\frac{\omega_{0exc}}{Q_{det}\omega_{0det}}\right)}$$

$\omega_{0exc}$ being the excitation frequency,
$\omega_{0det}$ being the detection frequency,
$Q_{det}$ being the quality factor.

The bias movement of the excitation mass is amplified by the oscillator of the detection mode by a factor A which shall be called amplification factor:

$$A = \left|\frac{1}{1 - \left(\frac{\omega_{0exc}}{\omega_{0det}}\right)^2 + i\frac{\omega_{0exc}}{Q_{det}\omega_{0det}}}\right| = \frac{1}{\sqrt{\left(1 - \left(\frac{\omega_{0exc}}{\omega_{0det}}\right)^2\right)^2 + \left(\frac{\omega_{0exc}}{Q_{det}\omega_{0det}}\right)^2}}$$

In case of a tuned frequency operating mode, i.e. the excitation frequency and the detection frequency are equal, the amplification factor A is:

$$A = Q_{det}$$

The quality factor $Q_{det}$ is about 1,000 to 100,000.
In this case, the mechanical sensitivity is:

$$\frac{Y_\Omega}{\Omega} = \frac{2XQ_{det}}{\omega_{0exc}} = \frac{2XA}{\omega_{0exc}}$$

In case of a non-tuned frequency operating mode, i.e. the excitation frequency is less than the detection frequency, the amplification factor is:

$$A \approx \frac{1}{2\frac{\Delta\omega}{\omega_{det}}}$$

The amplification factor A is about 2 to 100. For an operating frequency $f_{0exc}$ at 20 kHz and an offset of 1 kHz with $f_{0det}$, this factor is 10. In this case, the mechanical sensitivity is:

$$\frac{Y_\Omega}{\Omega} = \frac{2\omega_{0exc}X}{2\frac{\Delta\omega}{\omega_{0det}}\omega_{0det}^2} = \frac{2X}{\omega_{0exc}}A \times \left(1 - \frac{1}{2A}\right)^2$$

Note that the excitation frequency is known, since the excitation mode is resonance controlled.

However this amplification factor can vary substantially over the whole of the same substrate or from one substrate to another. In particular, when operating with non-tuned frequencies, there can easily be a variation of a factor 2, and even more, according to the nominal frequency offset sought. In addition, this amplification factor varies with the temperature.

Moreover, in the case of a gyroscope implementing a capacitive detection, with the movement according to the detection mode being transformed into a capacitance change, the capacitance change depends on the change in the air gap between the electrodes during the movement of the detection mass. However the initial dimension of the air gap is able to vary from one chip to another, but is in general controlled to within a few percentage points, and even less than 1%.

The existence of these technological defects imposes to calibrate the gyroscopes before they are used in order to determine for one or several temperatures the bias inherent to each sensor and to know the sensitivity of the sensor.

Such a calibration is carried out by means of a rotating table. In particular, for multi-axis sensors, it is either necessary to take a number of measurements proportional to the number of axes on the different tables, or to use complex tables, such as that which is described in document U.S. Pat. No. 6,209,383.

Due to the deviation of gyroscopes, regular temperature corrections or recalibrations are to be planned.

The temperature correction can be made via a prior calculation in temperature then, once the coefficients of the change in the temperature properties are known, through a temperature measurement of the sensor during operation.

This measurement can be taken by measuring the resonant excitation frequency, which is known. The output signal is then corrected by taking the temperature into account.

Regular recalibrations can also be carried out. For example, document US 2011/0172820 describes a method for recalibrating a gyroscope mounted in a robot. The recalibration is carried out when the robot is static using signals emitted by the gyroscope. In document US 2011/0178707, the recalibration implements other sensors such as accelerometers and magnetometers.

DISCLOSURE OF THE INVENTION

It is consequently a purpose of this invention to offer a gyroscope that can be calibrated and recalibrated in a simplified manner and a simplified calibration and recalibration method for a gyroscope.

The aforementioned purpose is achieved by a gyroscope comprising a mass capable of movement due to excitation and a mass capable of movement due to detection, means for applying an excitation signal to the excitation mass in a first direction, means for detecting the movement of the detection mass in a second direction orthogonal to the first direction and means for detecting the movement of the excitation mass in the second direction, and means for processing the detection signals emitted by the means for detecting movements of the detection mass and the means for detecting movements of the excitation mass in the second direction, in such a way as to obtain at least one calibration parameter of the gyroscope.

For example, these parameters can be the phase bias, the quadrature bias and the amplification factor.

The invention makes it possible as such to follow the change in the bias and/or in the sensitivity of the sensors during operation.

In other terms, the gyroscope measures in addition to the movement of the detection mass along the detection direction in order to determine the Coriolis forces, the movement of the excitation mass along the detection direction, with this movement being due to the bias. By taking this measurement, and by processing the latter with the measurement of the detection mass, it is possible to determine the bias of the gyrometer, phase bias and quadrature bias, the amplification factor and the rotation speed.

The knowledge of these parameters makes it possible to calibrate and recalibrate the gyrometer.

As mentioned hereinabove, these parameters vary with the temperature, if a variation in the temperature of the environment is detected, the parameters are again determined very simply thanks to the invention, which makes it possible to carry out a simplified recalibration of the gyrometer.

Thanks to the invention, the calibration can be carried out without a rotating table, and the recalibration is carried out without implementing additional sensors, or requiring a station position of the gyrometer; the latter can be carried out during the normal operation of the gyroscope, which simplifies recalibration.

The subject-matter of the invention thus is a gyroscope comprising:
- at least one excitation oscillator comprising at least one excitation mass suspended with respect to a substrate having a single direction of excitation movement,
- at least one detection oscillator comprising at least one detection mass suspended with respect to the excitation mass able to move according to the excitation direction and according to a detection direction orthogonal to the excitation direction,
- means for exciting the excitation mass in the direction of excitation movement,
- first detection means intended to detect the movement of the detection mass according to said detection direction and supplying a first detection signal,
with the gyroscope also comprising:
- second detection means intended to detect the movement of the excitation mass according to said detection direction and supplying a second detection signal, and
- means for processing the first detection signal and the second detection signal in such a way as to determine a rotation speed that the gyrometer is subjected to and to supply at least one calibration parameter of said gyroscope.

The rotation speed of the gyroscope is determined using Coriolis forces.

Preferably, said at least one calibration parameter of said gyroscope is the amplification coefficient that characterises the sensitivity of the gyroscope and/or the bias of the gyroscope. The amplification coefficient makes it possible to determine the sensitivity of the gyroscope using equations known to those skilled in the art and in particular those given hereinabove.

The means for processing the first detection signal and the second detection signal can be such that they determine using the first detection signal, the quadrature bias and the sum of the phase bias and of the rotation speed, that they determine using the second detection signal, the ratio of the phase bias over the amplification coefficient and the ratio of the quadrature bias over the amplification coefficient, and that they determine the amplification coefficient by carrying out a division of the quadrature bias over the ratio of the quadrature bias over the amplification coefficient.

The means for processing the first detection signal and the second detection signal can be such that they carry out a multiplication of the ratio of the phase bias over the amplification coefficient with the amplification coefficient determined by said division.

Preferably, the means for processing comprise means for amplifying the first and second detection signal and first means able to demodulate the amplified signals.

Also preferably, the means for processing further comprise second means for demodulating the amplified signals prior to the first means for demodulating and for filtering said signals in order to bring the demodulated signals to the actuating frequency of the gyroscope.

In an embodiment, the first and second means for detecting are of the capacitive type. The means for amplifying the signals measured can include an amplifier mounted in parallel with at least one capacitor.

In another embodiment, the first and second means for detecting are of the piezoresistive type. The means for amplifying the signals measured can include one or several amplifiers with differential inputs.

"Amplifier with differential inputs" means an amplifier that makes it possible to amplify the difference of the input signals.

For example, the first means able to demodulate the amplified signals comprise a filter of the second detection signal and a filter of the first detection signal, with the filter of the second signal being a filter with a band-pass less than that of a filter of the first signal in such a way as to have a close or identical resolution on the first detection signal and the second detection signal.

The gyroscope can comprise means for shifting the second detection signal in such a way as to reproduce a shifting of the detection oscillator, with said means for shifting applying this shifting before the demodulation of the second detection signal by the first means for demodulating.

Preferably, the gyroscope has excitation and detection frequencies that are not tuned.

Advantageously, the excitation mass is suspended with respect to the substrate by means of suspension of the spring type, said means of suspension having a first spring constant according to the direction of detection and a second spring constant according to the excitation direction, with the first spring constant being substantially greater than the second spring constant.

The ratio of the first spring constant over the second spring constant can be greater than 100.

The gyroscope can comprise means of connection, for example of a switch or switches, upstream of the means for amplifying in order to periodically carry out the determination of said at least one calibration parameter of said gyroscope.

Another subject-matter of the invention is a method for calibrating a gyroscope comprising at least one excitation oscillator comprising at least one excitation mass having a single direction of excitation movement, and at least one detection oscillator comprising at least one detection mass able to move according to the excitation direction and according to a detection direction, comprising the steps of:

a) measuring the movement of the detection mass in the detection direction, forming a first detection signal, b) measuring the movement of the excitation mass according to the direction of detection, forming a second detection signal, c) processing of the first detection signal and of the second detection signal in such a way as to determine a rotation speed that the gyrometer is subjected to and to supply at least one calibration parameter of said gyroscope, d) calibrating the gyroscope based on this parameter.

The step c) of processing the first and the second signal can comprise:

the processing of the first detection signal in such a way as to obtain the quadrature bias and the sum of the phase bias and of the rotation speed, the processing of the second detection signal in such a way as to obtain the ratio of the phase bias over the amplification coefficient and the ratio of the quadrature bias over the amplification coefficient, the determination of the amplification coefficient by dividing the quadrature bias over the ratio of the quadrature bias over the amplification coefficient.

The step a) can comprise the sub-steps of:

a1) amplifying and of filtering the first detection signal, a2) demodulating the first amplified signal, and the step b) can comprise the sub-steps of:

b1) amplifying and of filtering the second detection signal, b2) demodulating the second amplified signal.

The method for calibrating according to the claim can comprise the steps of demodulating and filtering between the steps a1) and a2) and between the steps b1) and b2) in order to bring the first and second amplified signals to the actuating frequency.

In an example wherein the detection signals are capacitive, the steps a2) and b2) are carried out by a stage of capacitive reading.

In an example wherein the detection signals are piezoresistive, the steps a2) and b2) are carried out by one or several amplifiers with differential inputs The method is advantageously implemented continuously or periodically or on a one-off basis following a variation in the environment of the gyroscope.

The method can be implemented during the life of the gyroscope in such a way as to recalibrate it.

The step of recalibrating takes place preferably during the normal operation of the gyroscope.

The step of recalibrating can be implemented after the detection of the change in the temperature of the environment of the gyroscope.

BRIEF DESCRIPTION OF THE DRAWINGS

This invention shall be better understood using the following description and the annexed drawings wherein.

DETAILED DISCLOSURE OF PARTICULAR EMBODIMENTS

This invention relates to the calibration and the recalibration of any gyroscope comprising at least one excitation mass and at least one detection mass. Several examples of structures of gyroscopes to which the invention applies shall now be described, but the latter are in no way restrictive and the invention applies to any other gyroscope structure with at least one excitation mass and at least one detection mass, the excitation mass having a degree of freedom in movement along the excitation axis. Furthermore, gyroscopes comprising several excitation masses connected together and mechanically coupled, with each excitation mass having a degree of freedom that can be different from that of the other excitation masses and each being associated with a detection mass, do not leave the scope of this invention.

"Axis" or "direction" will be used indifferently to designate the direction of movement of the masses.

For all of the figures, the axes shall be defined as follows, the axes X and Y are contained in the plane of the sheet, with the axis X being oriented horizontally in the representation of the structures and the axis Y being oriented vertically in the representation of the figures. The axis Z is orthogonal to the axes X and Y and in the plane of the sheet.

Figure 1:
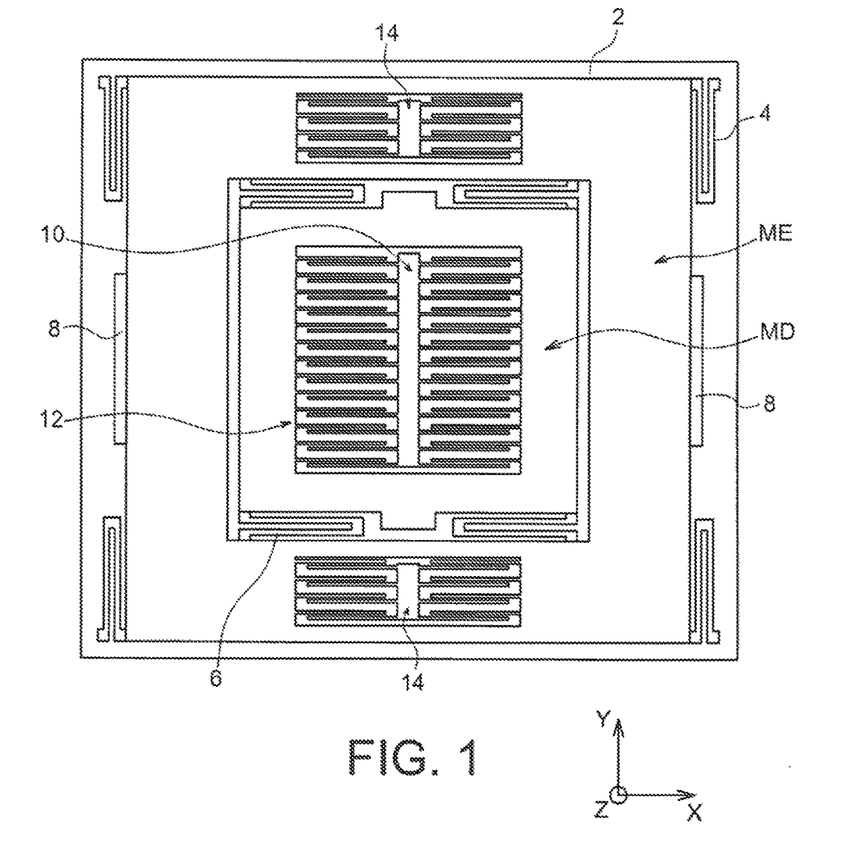
FIG. 1 is a top view of an example of a structure of a gyroscope with capacitive detection to which the invention can be applied, the gyroscope being a gyroscope of the Z type.

FIG. 1 shows a gyroscope structure S1 of the Z type with capacitive detection.

The structure S1 comprises an excitation mass ME forming a frame suspended with respect to a substrate 2 by means of suspension 4 of the spring type, a detection mass MD arranged inside the frame of the excitation mass ME and suspended from the latter by the intermediary of the means of suspension 6 of the spring type. The suspended excitation mass forms an excitation oscillator and the suspended detection mass forms a detection oscillator 3.

The means of suspension 4 of the excitation mass are such that they authorise it to move in the direction of the axis X under the effect of an excitation signal applied by means of excitation 8. For example, the means of excitation typically comprise electrostatic actuating electrodes, in the form of an interdigitated comb structure located on the exterior edge of the structure according to the direction of the axis X. The combs comprise fixed electrodes (integral with the substrate 2 to which a variable electrostatic potential is applied and mobile electrodes integral with the excitation mass. Electrostatic forces thus appear between the fixed and mobile electrodes.

The means of suspension 6 of the detection mass are such that they authorise it to move in translation according to the direction of detection Y under the effect of a Coriolis force generated by a rotation about the axis Z. First means for detecting 10 of the capacitive type are provided in order to detect the movement of the detection mass MD. In the example shown, the first means for detecting 10 are formed of two pairs of interdigitated electrode combs 12, with a comb of each pair being carried by the detection mass MD and a comb of each pair 12 being carried by the substrate 2. Advantageously in the example shown, the implementation of two pairs of combs makes it possible to symmetrise the structure, but the latter is not limiting. By measuring a capacitance change between the pairs of electrodes 12 of each pair of combs, it is possible to determine the movement of the detection mass MD along the axis Y. The signal supplied by the first capacitive means for detecting is designated by $C1+\Delta C1$.

Furthermore, the structure comprises means for detecting the movement of the excitation mass ME along the axis Y, with this movement being primarily due to the bias. The Coriolis forces participate very little in this movement.

The second means for detecting 14 are of a structure similar to that of the first means for detecting, they comprise two pairs of interdigitated combs of which one comb of each pair is carried by the excitation mass and a comb of each pair being carried by the substrate. The signal supplied by the second means for capacitive detecting is designated by $C1'+\Delta C1'$.

It will be understood that the structure is such that the excitation mass ideally has a movement in the excitation direction, but as has been explained hereinabove with the technological defects during the manufacture of gyroscopes, the movement of the excitation mass has a main component in the excitation direction and a secondary component in the detection direction.

According to the invention it is also planned to measure this component and to use it in order to determine calibration and recalibration parameters.

Figure 2A:
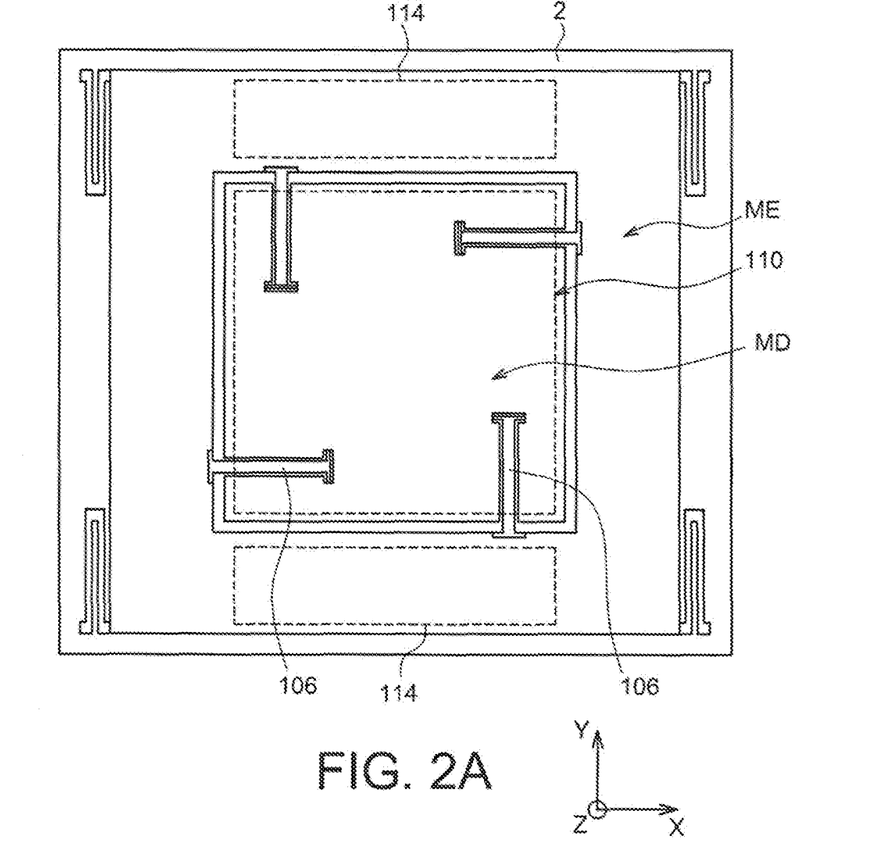
FIG. 2A is a top view of another example of a structure of a gyroscope with capacitive detection to which the invention can be applied, the gyroscope being a gyroscope of the X/Y type.
Figure 2B:
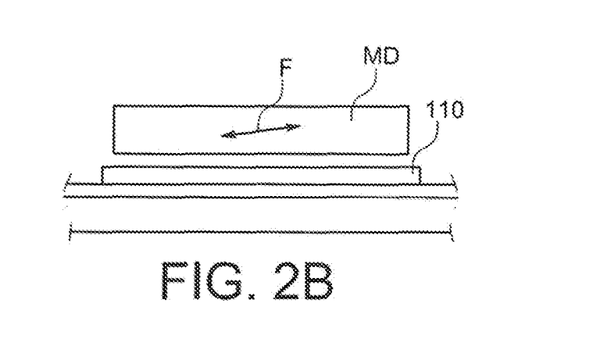
FIG. 2B is a partial side view of the structure of FIG. 2A.

FIGS. 2A and 2B shown another example of the structure S2 of a gyroscope with capacitive detection of the X/Y type.

In this example, the means of excitation apply an excitation signal to the excitation mass ME along the direction X. The means of excitation are for example of the electrostatic type as described hereinabove in relation with the structure S1.

The means of suspension 106 of the detection mass with respect to the excitation mass ME are such that they authorise a movement in translation of the detection mass along the axis Z under the effect of a Coriolis force generated by a rotation about the axis Y.

The first means for detecting 110 are of the capacitive type and formed by a pair of electrodes of which one is carried by the substrate 2 and the other is formed by the detection mass MD facing the electrode carried by the substrate.

The second means for detecting 114 are of the capacitive type and formed by two pairs of electrodes. One electrode of each pair is carried by the substrate 2 and the other electrode of each pair is formed by the excitation mass ME facing the electrode carried by the substrate. The electrodes carried by the excitation mass ME are arranged on either side of the detection mass MD along the axis Y. The two electrodes 114 are connected electrically. This arrangement is advantageously chosen so as to symmetrise the structure. This arrangement is not limiting.

In FIG. 2B, the arrow F symbolises the movement of the masses in the detection direction.

Figure 3:
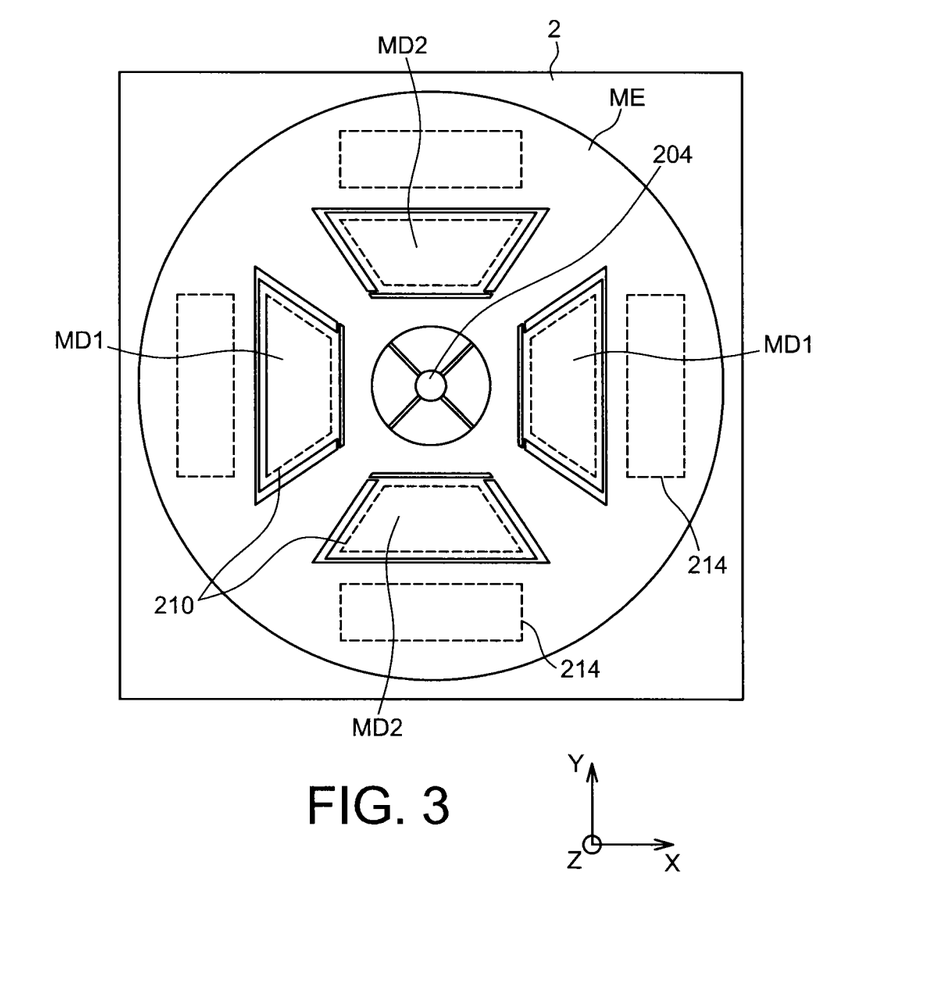
FIG. 3 is a top view of another example of a structure of a gyroscope with capacitive detection of the oscillating disc type to which the invention applies, the gyroscope being a gyroscope of the X/Y type.

FIG. 3 shows another example of a structure S3 of a gyroscope with capacitive detection of the XY type. The structure S3 is of the oscillating disc type.

In this example the excitation mass ME has the form of a disc suspended with respect to the substrate on a central portion of the disc by means of suspension 204.

The structure comprises means of excitation, the latter typically contain electrostatic actuating electrodes, for example of the interdigitated electrode type. They are for example located on the external edge of the detection mass, in such a way as to apply a tangential force to the disc. The means of excitation set into movement the excitation mass in rotation about the axis Z.

The structure also comprises four detection masses MD1, MD2, suspended in the disc by means of suspension of the torsion beam type. Two of the detection masses MD1 among the four are able to pivot about the axis Y and the two other detection masses MD2 are able to pivot about the axis X.

The first means for detecting 210 are formed by a pair of electrodes associated with each detection mass MD1, MD2, one of the electrodes formed by the mass and the other on the facing substrate 2.

The second means for detecting 214 comprise four pairs of diametrically opposed electrodes two by two. Each pair comprises one electrode on the excitation mass and one electrode on the substrate. In the example shown, each pair of electrodes of the second means for detecting are aligned with a pair of electrodes of the first means for detecting along a radius of the disc. This arrangement is advantageous. The two electrodes 214 along the axis X are associated with the two detection electrodes 210 of masses MD1 along the axis X and make it possible to take measurements of the Coriolis force and of the bias associated with the rotation of the axis X. The masses MD1 are excited along the axis Y, and a rotation about the axis X drives a Coriolis force along the axis Z, the movement along the axis Z is detected by the electrodes 210 and 214.

Similarly, the electrodes along the axis Y make it possible to measure the Coriolis force and of the bias associated with the rotation of the axis Y. The masses MD2 are excited along the axis X, and a rotation about the axis Y drives a Coriolis force along the axis Z, the movement along the axis Z is detected by the electrodes 210 and 214.

Figure 4:
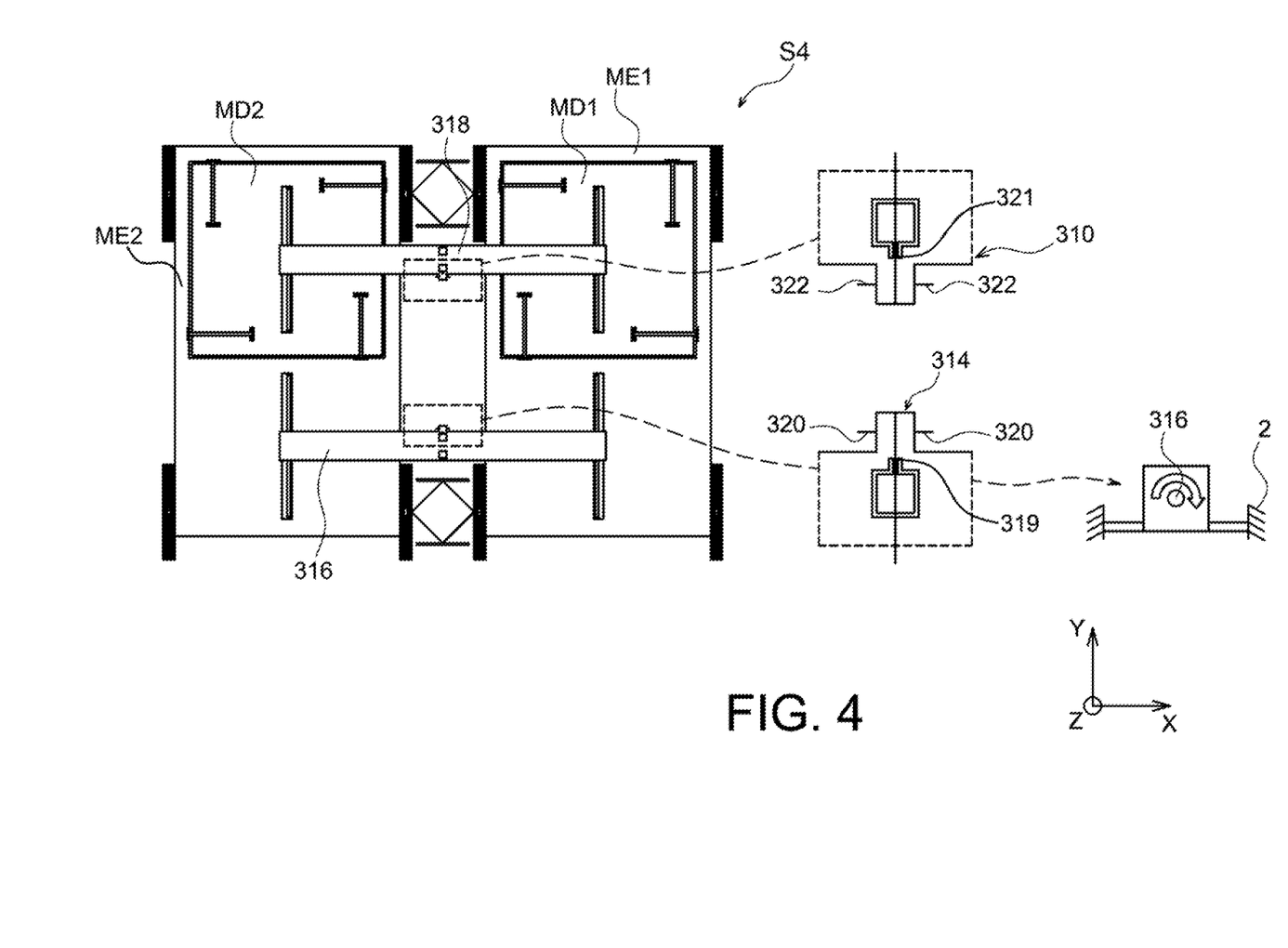
FIG. 4 is a top view of another example of a structure of a gyroscope with piezoresistive detection to which the invention applies, the gyroscope being a gyroscope of the X/Y type.
Figure 5:
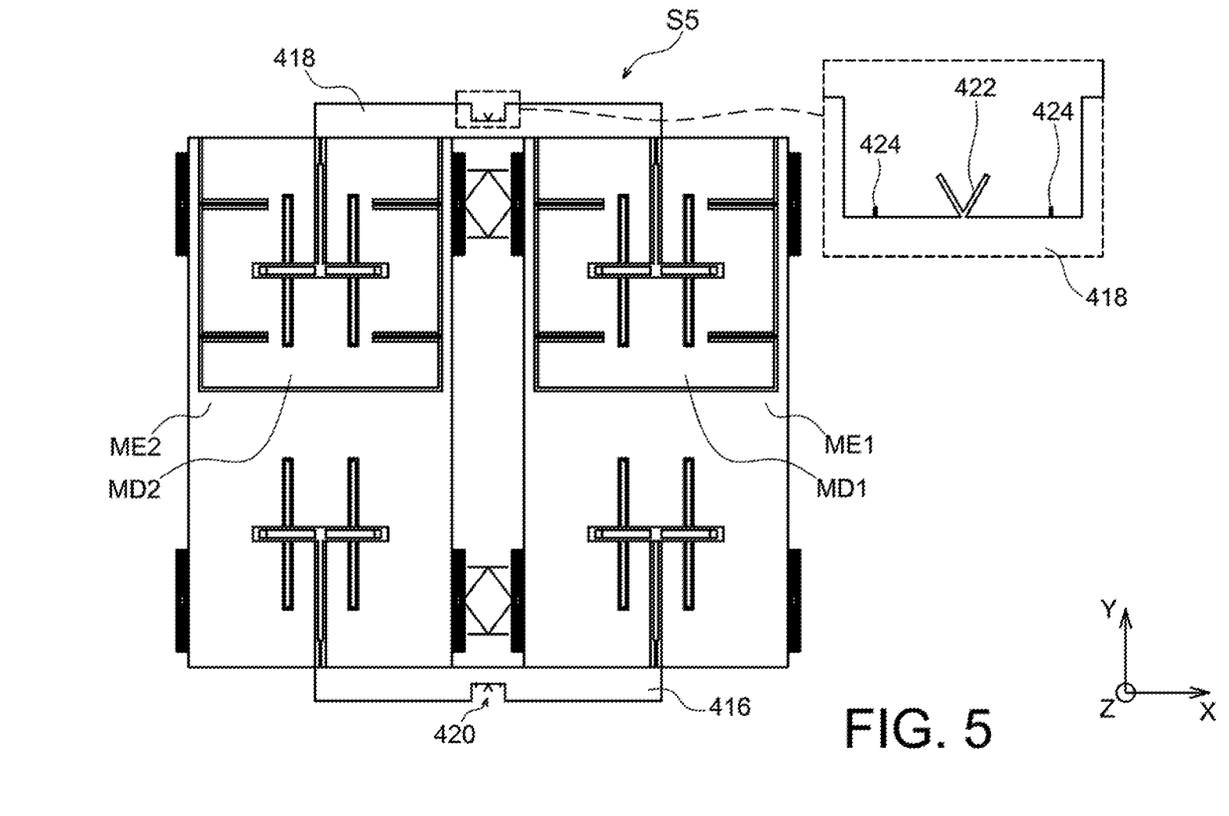
FIG. 5 is a top view of another example of a structure of a gyroscope with piezoresistive detection to which the invention applies, the gyroscope being a gyroscope of the Z type.

FIGS. 4 and 5 show examples of structures of a gyroscope with piezoresistive detection.

In FIG. 4, this is a structure S4 of a gyroscope adapted for an X/Y detection.

In FIG. 4, this is a gyroscope with Y detection.

The structure S4 comprises two excitation masses ME1, ME2 connected by a beam 316. The means of excitation are able to excite the excitation masses ME1, ME2 along the axis X, with the masses ME1 and ME2 being actuated with phase opposition.

The structure S4 comprises two detection masses MD1, MD2 each one suspended in a portion ME1, ME2 of the excitation mass ME. The two detection masses MD1, MD2 are connected by a beam 318.

The beams 316, 318 are articulated about the substrate 2 by the torsion deformable beams 319, 321 which can be seen on the enlarged views, respectively, defining the axis of rotation of the beams. This axis of rotation is in the direction Y. The references 320 and 322 designate piezoresistive measurement gauges forming the detection means 314, 310 of the excitation mass and of the detection mass respectively.

The movement of detection is done along the axis Z, but with phase opposition between the masses MD1 and MD2, with this swinging movement driving the beams 316 and 318 in rotation about the axis Y.

In this figure, due to the fact that the gauges 320, 322 are located in a different plane than that of the torsion axis defined by the beam 320, 321 respectively, the rotation of the beams 316 and 318 to which are attached the gauges 320, 322 respectively, induce a tension/compression force on the gauges 320, 322. The means for measuring 314 are associated with the measurement of the movement of the excitation masses ME1, ME2 along the axis of detection Z and the means for measuring 310 are associated with the measurement of the movement of the detection masses MD1, MD2 along the axis of detection Z.

The signal supplied by the first means of piezoresistive detection is designated by R1+ΔR1, and the signal provided by the second means of piezoresistive detection is designated by R1'+ΔR1'.

In FIG. 5, this is a structure S5 of the gyroscope with Z detection comprising two excitation masses ME1, ME2 excited along the axis X or Y. The two excitation masses ME1, ME2 are connected by a beam 416 articulated in rotation on the substrate about the axis Z. In the example shown, the means of suspension of the beam 416 are formed by two concurrent beams 420 on the axis Z. The second means for detecting 414 are formed by two piezoresistive gauges on either side of the means of suspension 420. The two gauges provide a differential measurement.

The structure S5 comprises two detection masses MD1, MD2 connected by a beam 418 articulated in rotation on the substrate about the axis Z. In the example shown, the means of suspension of the beam 418 are formed by two concurrent beams 422 on the axis Z. The first means for detecting 410 are formed by two piezoresistive gauges 424 on either side of the means of suspension 422. The two gauges provide a differential measure.

According to another variant, the means for detecting can be of the magnetic type.

The excitation masses ME1 and ME2 are set into movement according to X and under the effect of a rotation about Z, the two detection masses MD1, MD2 move along the axis Y with phase opposition, and drive the beam 418 according to a rotation movement about the axis Z.

Preferably, the first and second means for detecting are of the same type, but it shall be understood that this is not necessary and that a structure wherein the detection of the movement of the detection mass is capacitive or piezoresistive, can comprise a piezoresistive or capacitive detection respectively of the movement of the excitation mass.

The gyroscope according to the invention also comprises means for processing the detection signal coming from the detection mass in order to determine a rotation speed that the gyrometer is subjected to using the Coriolis forces and to supply at least one calibration parameter of said gyroscope.

The means for determining the rotation speed that the gyrometer is subjected to are well known to those skilled in the art and shall not be described. The means for processing and the method implemented in order to determine at least one parameter allowing for a calibration of a gyroscope and/or its recalibration shall now be described in detail.

The gyroscope structure according to the invention delivers two signals, a signal representing the movement of the detection mass in the detection direction and a signal representing the displacement of the excitation mass in the detection direction.

Figure 6:
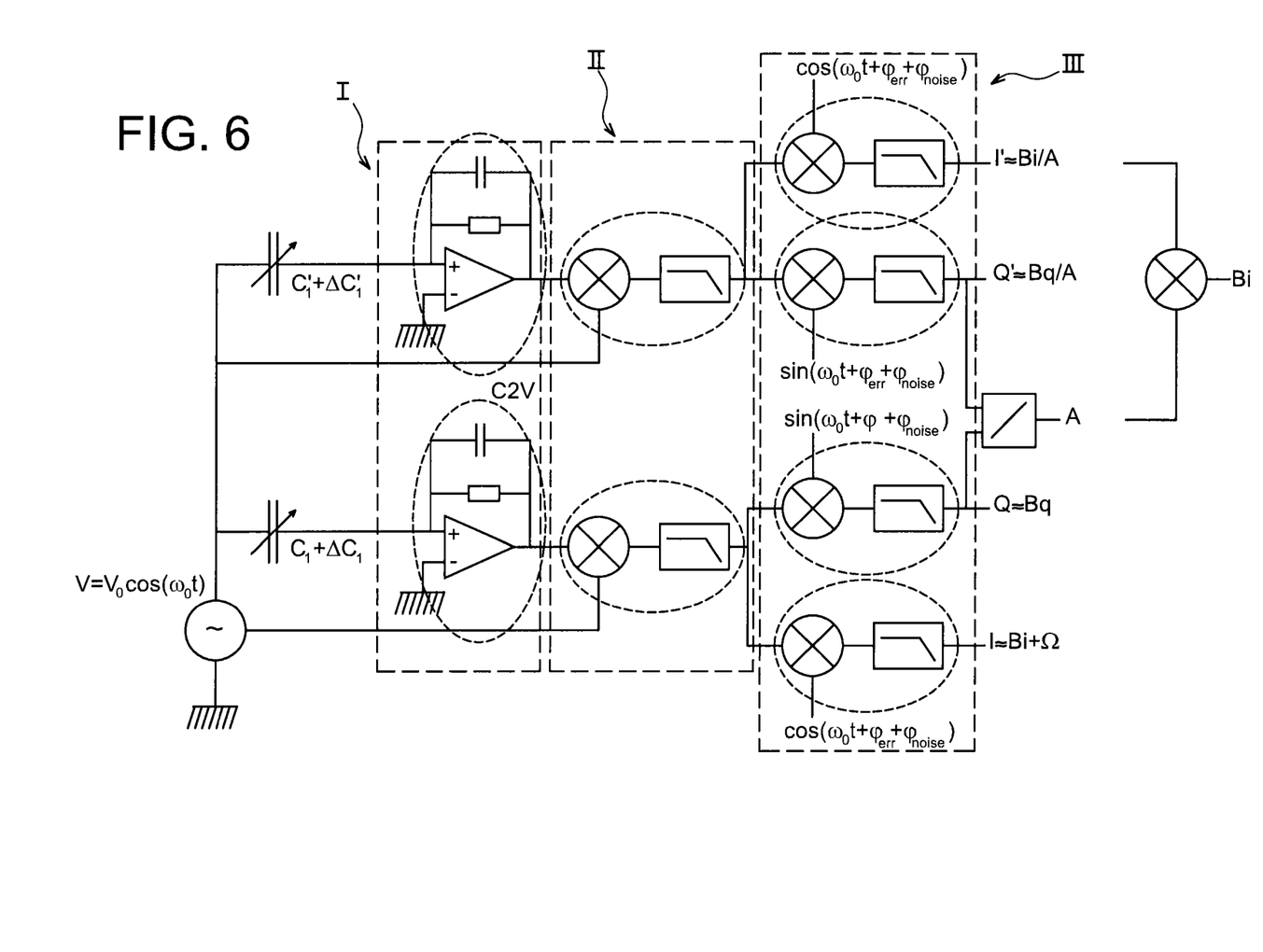
FIG. 6 shows a measurement diagram of the calibration parameters according to a method for calibrating according to the invention applied to a gyroscope with capacitive detection.
Figure 7:
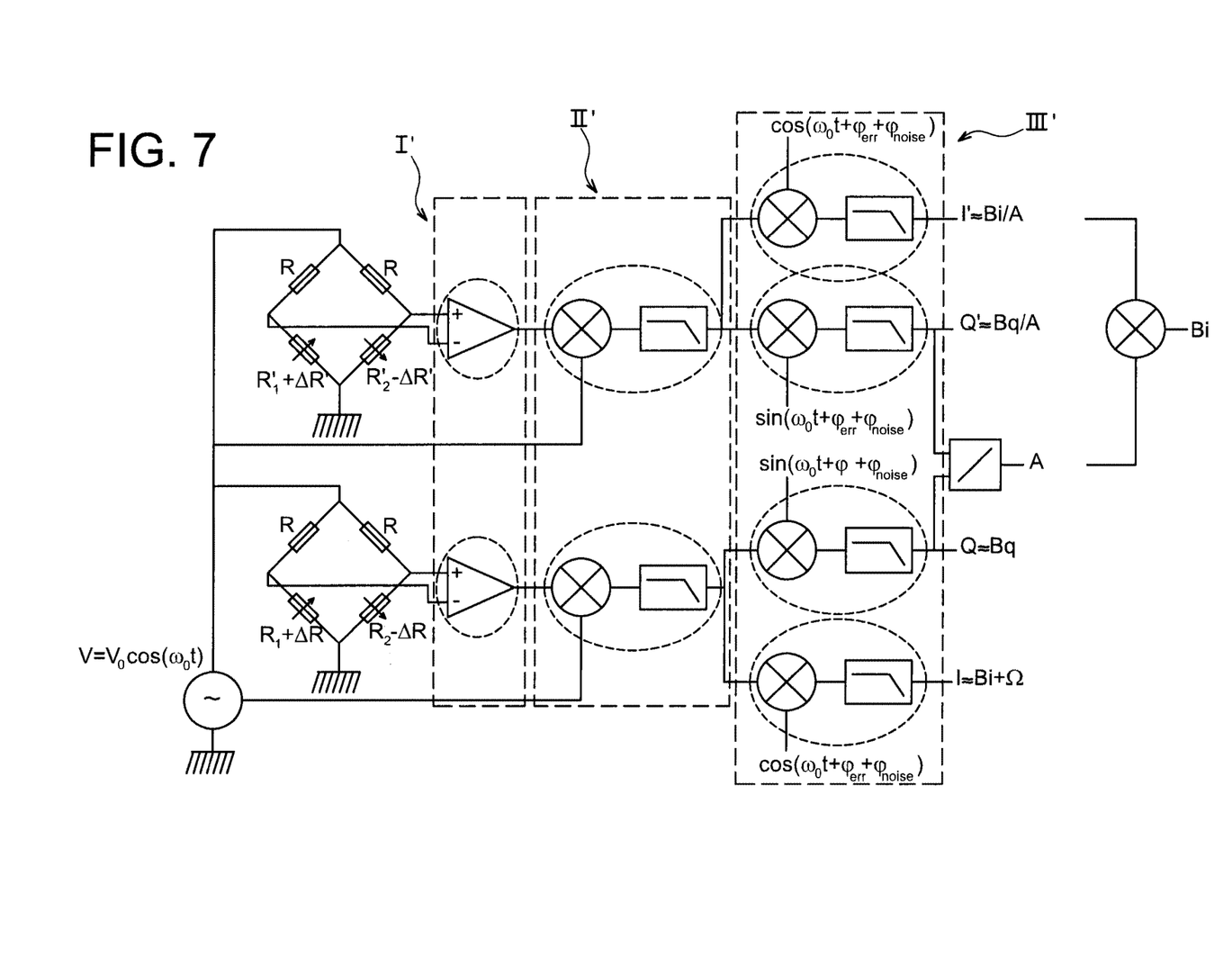
FIG. 7 shows a measurement diagram of the calibration parameters according to a method for calibrating according to the invention applied to a gyroscope with piezoresistive detection, FIG. 8 graphically shows the variation in the amplification factor A obtained by X cos simulation as a function of time in seconds, FIG. 9 graphically shows the difference between the phase bias reconstructed by simulation and the phase bias Bi measured on the detection mass as a function of time in seconds.

The means for processing these signals are shown diagrammatically in FIGS. 6 and 7 for a structure of a gyroscope with capacitive detection and for a structure of a gyroscope with piezoresistive detection respectively.

In the example shown, the means for processing apply the following steps to the two detection signals:
- a step of amplifying detection signals,
- a possible step of demodulation, indeed in general the detection signal is modulated by a reading voltage at a frequency $f_e = \omega_e/2\pi \gg f_0$. The signal is therefore demodulated and filtered in order to bring it to the frequency $f_0 = \omega_0/2\pi$ of the equation (1),
- a step of demodulating and of filtering the signal in order to obtain the rotation speed of the detection mass with a bandwidth defined by the last filter.

With regards to the step of amplifying, in the case of a capacitive detection, this is a step of transforming a capacitance change into voltage change, a stage of capacitive reading is used, which is for example a stage C2V (capacitance to voltage converter). In this case, the electrode of the variable capacitor is connected to an input of a linear amplifier, this same input is connected to the output of the amplifier by the intermediary of a capacitor Ci and of a resistor Ri in parallel.

The other input of the amplifier is earthed. If a voltage $V_0 \cos(\omega_e t)$ is applied on the other side of the variable capacitor, and if $\omega_e \gg 1/(RiCi)$, the output voltage of the stage C2V is $-V_0 * \Delta C/Ci$.

In the case of a piezoresistive detection, a stage of piezoresistive reading is used. Piezoresistive gauges are, advantageously, arranged in a Wheatstone bridge configuration. This then entails reading a voltage change, which can be done by using a differential linear amplifier or a set of amplifiers with differential inputs. In particular, a set of three linear amplifiers can be used in such a way as to constitute an amplifier referred to as instrumentation, which can have very low read noise.

By way of example, an instrumentation amplifier of the AD8428 sold by Analog Devices® can be used.

Preferably, the means of suspension of the excitation mass are selected in such a way as to have a rigidity along the axis of detection that is much higher than that in the excitation direction in order to limit the effect of the Coriolis force with respect to that of the quadrature bias.

Indeed, the Coriolis force is exerted on the excitation mass. If this Coriolis force $F_\Omega$ is compared with the equivalent force due to the bias $F_{Bq}$, we have $$\frac{F_\Omega}{F_{Bq}} = \frac{2m_1 \omega_0 X \Omega}{\alpha k_{y1} X} = \frac{2m_1 \omega_0 \Omega}{2\frac{B_q}{\omega_0} k_{y1}} = \frac{\Omega}{B_q}\left(\frac{\omega_0}{\omega_{0y1}}\right)^2 = \frac{\Omega}{B_q}\frac{k_{x1}}{k_{y1}}\frac{m_1}{m_1 + m_2}$$

$k_{y1}$ and $k_{x1}$ are respectively the spring constants of the means of suspension of the excitation mass in the detection direction and the excitation direction.

By selecting the means of suspension of the excitation mass such that $k_{y1} \gg k_{x1}$, the disturbance due to the Coriolis force is less than 2 or 3 magnitudes maximum with respect to the effect due to the quadrature bias. For example $k_{y1}\ k_{x1}$ is greater than 100.

In the example shown, the means for processing, in the case of a gyroscope with capacitive detection, comprise means I for transforming the capacitance change into a voltage change, possibly means of demodulating II and of filtering the signal in order to bring it to a frequency $f_0 = \omega_0/2\pi$ and means of demodulating and of filtering III in order to obtain the rotation speed of the detection mass MD with a bandwidth defined by the filter of means III.

In the example shown, the means for processing, in the case of a gyroscope with piezoresistive detection, comprise means I' forming an instrumentation amplifier which were described hereinabove, possibly means of demodulating and of filtering II' of the signal in order to bring it to a frequency $f_0 = \omega_0/2\pi$ and means of demodulating and of filtering III' in order to obtain the rotation speed of the detection mass with a bandwidth defined by the filter of means III'.

The means for processing thus deliver:
- using the detection signal of the detection mass MD, the processed signals I and Q, such that Q~Bq, the quadrature bias and I~Bi+$\Omega$, the sum of the phase bias and of the rotation speed.
- using the detection signal of the excitation mass, the processed signals I' and Q', such that Q' ~Bq/A, the ratio of the quadrature bias Bq and of the amplification factor A, and I' ~Bi/A, the ratio of the phase bias and of the amplification factor A.

It is then possible to determine the amplification factor by calculating the ratio Q/Q'.

The phase bias Bi can also be deduced from this at any time by calculating I'×Q/Q'.

As such, thanks to the invention, the amplification factor A using the relation (I), the phase bias Bi and the quadrature bias Bq can be known at any time.

With the knowledge of the amplification factor A, it is possible to determine the sensitivity of the structure. Indeed, the sensitivity in a tuned frequency operating mode is given by the relation:

$$\frac{Y_\Omega}{\Omega} = \frac{2XA}{\omega_{0exc}}$$

In the case of a non-tuned operating mode, the sensitivity is given by the relation $$\frac{Y_\Omega}{\Omega} = \frac{2X}{\omega_{0exc}} A \times \left(1 - \frac{1}{2A}\right)^2$$

Using these parameters, it is possible to simply carry out a calibration of the gyroscope without requiring recourse to a complex rotating table.

Furthermore, steps of recalibrating the gyroscope can take place in a simplified manner. For example, a step of recalibrating can be launched when there is a substantial change in the temperature of the environment wherein the gyroscope is located. Indeed, the parameters obtained are obtained at the operating temperature of the gyroscope. As such, if a change in temperature is detected, a step of recalibrating the gyroscope can be launched.

Preferably, the steps for recalibrating are such that the recalibration is periodic and further preferably such that the recalibration is continuous.

A simulation of the processing of the signal after the demodulation of the measurements shall now be described, with the latter having been carried out with the X cos software.

The parameters for the simulation are as follows:
resonant excitation frequency 20 kHz,
resonant detection frequency 21 kHz,
quality factor in detection Qs=10000,
amplification A of the detection resonator 10.756,
white noise of measure 0.01°/s/√Hz,
phase error of the demodulator $\phi_{err}=1°$,
phase noise of the demodulator $\phi_{noise}=10^{-5}$ rad/√Hz,
quadrature bias signal 1000°/s;
phase bias signal −100°/s,
bandwidth of the signal measured on the detection mass 100 Hz,
bandwidth of the signal measured on the excitation mass 1 Hz.

The simulation covers a duration of 10 s, due to the filter at 1 Hz, the data is processed starting at 2 s.

Ω is considered to be zero, as such the measurement I on the detection mass directly gives the phase bias Bi measured on the detection mass.

Figure 8:
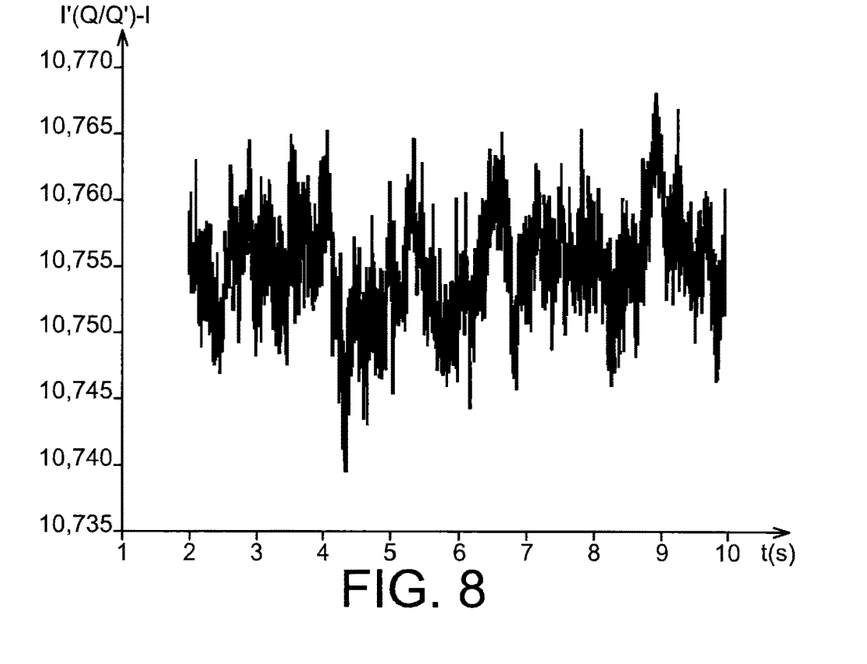

FIG. 8 shows the variation in the amplification factor A according to the time obtained by the ratio Q/Q'. On the average, A is equal to 10.755 for a theoretical value of 10.756, with a resolution of 0.003.

Using this amplification factor and the measurement I', the phase bias Bi can be reconstructed and its value can be estimated. In the case at hand a reconstructed phase bias of −117,45°/s is obtained, instead of 118,46°/s measured on the detection mass MD, which is given by the signal I on the detection mass MD as explained hereinabove.

Figure 9:
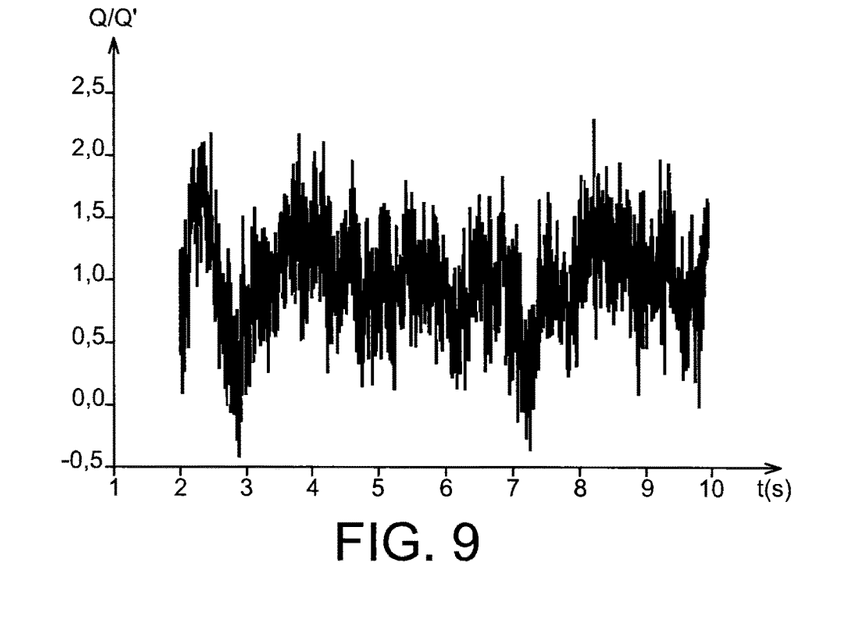

The phase bias is thus obtained to within 1°/s on the average with a resolution of 0.29°/s, for a resolution of the signal measured on the detection mass of 0.24°/s. FIG. 9 shows the variation in the difference between the bias reconstructed which is equal to $$I' \frac{Q}{Q'}$$

and the bias measure which is equal to I as a function of time.

This difference of 1°/s is due to the shifting induced by the detection resonator $\phi_{TF}$.

Taking the demodulation errors into account, the value of the ratio Q/Q' is:

$$\frac{Q}{Q'} \approx A\left(1 - \frac{B_i}{B_q}\varphi_{TF}\right)$$

Knowing that in general, $B_i < B_q$ and in our case, which is representative of real cases, $\phi_{TF}=10^{-3}$ rad, the ratio Q/Q' gives an estimate of the coefficient A with good accuracy.

Taking the demodulation errors into account, a difference is obtained between the reconstructed phase bias and the measured phase bias:

$$I' \frac{Q}{Q'} - I \approx -B_q \varphi_{TF}$$

The phase error induced by the electronics is thus possible to be overcome, but not that induced by the detection oscillator.

The error induced by the detection oscillator is low but is not known precisely and can vary in temperature.

Experimental results make it possible to evaluate a coefficient in temperature of about 600 ppm/K for $\phi_{TF}$, which quantifies the dependence of the shifting $\phi_{TF}$ with the temperature. This coefficient is therefore about 1 predominant magnitude with respect to the coefficient in temperature of the quadrature bias Bq.

$$\frac{\delta\varphi_{TF}}{\varphi_{TF}\delta T} \approx -\frac{\delta Q_{det}}{Q_{det}\delta T}$$

This results in a deviation of 0.6 m°/s/K of the residual bias, which is very low compared to the residual bias of gyroscopes of the state of the art. Indeed, a gyroscope of the state of the art has a bias between +75°/s and −75°/s for a full scale of 2000°/s and a bias deviation of 40 m°/s/K.

Advantageously, a lower frequency filter is chosen to filter the signal of the excitation mass than that intended to filter the signal on the detection mass, which makes it possible to have a measurement accuracy comparable between the processing of the signal of the detection mass and the signal of the excitation mass. Indeed, if it is considered that a less substantial data flow coming from the measurement on the excitation mass is needed, the measurement on the excitation mass can be filtered with a filter with a lower frequency that that intended to filter the signal on the detection mass.

For example, for an excitation frequency of 20 kHz, and a nominal frequency offset of 1 kHz, the amplification factor is about 10 and therefore the measurement on the excitation mass is 10 time noisier than on the detection mass. If the bandwidth is 100 Hz on the measurement of the detection mass, an identical resolution on the measurement on the excitation mass with a filter at 1 Hz is obtained.

In an advantageous variant, a phase shifter before the demodulation of the signal coming from the excitation mass can be provided in order to reproduce the shifting of the detection oscillator. For example, a phase value will be chosen that corresponds to the average of the shiftings induced by the detection oscillator. The reconstructed bias of each gyroscope will then be brought closer to the value of zero.

The invention makes it possible to simplify and even avoid calibrating gyroscopes and to deduce in real time the changes in the sensitivity and/or in the bias of a gyroscope. Indeed, thanks to the invention it is no longer required to use tables.

The invention also makes it possible to simplify the steps of recalibrating since it does not require the implementation of other sensors, or a static state of the device. Indeed the bias and the sensitivity can be determined at any time in the normal operation of the gyrometer. Furthermore, the invention allows for a monitoring of these parameters and therefore a following of the operating condition of the gyrometer.

For example, in the case of products for the general public for which the sensitivity needs to be known only within a few percentage points, no calibration via a rotating table is necessary. The calibration is obtained solely thanks to the invention and is applied continuously or periodically on the sensor. There will be a low uncertainty on the sensitivity due to the uncertainty on the value of the air gap in the case of a capacitive detection, or on the dimension of the piezoresistive gauges in the framework of a piezoresistive detection. On the other hand, if it is desired to know the sensitivity precisely, a calibration on a rotating table with a single sure temperature is sufficient, the change in the parameters is then followed by the processing according to the invention.

The invention can be applied to any architecture that has an excitation mass with a degree of freedom along the excitation mode, for example to gyroscopes of the oscillating disc type such as that shown in FIG. 3.

This invention is particularly interesting for gyroscopes with excitation and detection frequencies that are not tuned, since the amplification factor is further reduced: 1 to 100 compared to 1,000 to 100,000 in the case of tuned frequencies.

The invention claimed is:

1. A gyroscope comprising:
   at least one excitation oscillator comprising at least one excitation mass suspended with respect to a substrate having a single direction of excitation movement;
   at least one detection oscillator comprising at least one detection mass suspended with respect to the excitation mass configured to move according to the excitation direction and according to a detection direction orthogonal to the excitation direction;
   electrodes for exciting the excitation mass in the direction of excitation movement;
   a first detector configured to detect movement of the detection mass according to the detection direction and supplying a first detection signal;
   second detector configured to detect movement of the excitation mass according to the detection direction and supplying a second detection signal; and
   an instrumentation amplifier configured to process the first detection signal and the second detection signal to determine a rotation speed that the gyroscope is subjected to and to supply at least one calibration parameter of the gyroscope.

2. A gyroscope according to claim 1, wherein the at least one calibration parameter of the gyroscope is an amplification coefficient that characterizes sensitivity of the gyroscope and/or bias of the gyroscope.

3. A gyroscope according to claim 1, wherein the instrumentation amplifier determines, using the first detection quadrature bias and the sum of phase bias and of rotation speed, determines, using the second detection signal, the ratio of the phase bias over an amplification coefficient and the ratio of the quadrature bias over the amplification coefficient, and determines the amplification coefficient by dividing the quadrature bias by the ratio of the quadrature bias over the amplification coefficient.

4. A gyroscope according to claim 3, wherein the instrumentation amplifier carries out a multiplication of the ratio of the phase bias over the amplification coefficient with the amplification coefficient determined by the dividing of the quadrature bias by the ratio of the quadrature bias over the amplification coefficient.

5. A gyroscope according to claim 1, wherein instrumentation amplifier is configured to amplify the first and the second detection signal and includes a first demodulator for demodulating the amplified signals.

6. A gyroscope according to claim 5, wherein the instrumentation amplifier includes a second demodulator for demodulating the amplified signals prior to the first demodulator and for filtering the signals to bring the demodulated signals to an actuating frequency of the gyroscope.

7. A gyroscope according to claim 5, wherein the first and second detectors are capacitive detectors, and wherein the instrumentation amplifier comprises an amplifier mounted in parallel with at least one capacitor.

8. A gyroscope according to claim 5, wherein the first and second detectors are piezoresistive detectors, and wherein the instrumentation amplifier comprises one or plural amplifiers with differential inputs.

9. A gyroscope according to claim 1, wherein the first and second detectors are capacitive detectors.

10. A gyroscope according to claim 1, wherein the first and second detectors are piezoresistive detectors.

11. A gyroscope according to claim 1, wherein the instrumentation amplifier is configured to amplify the first and the second detection signal and includes a first demodulator configured to demodulate the amplified signals, and
    wherein the first demodulator configured to demodulate the amplified signals comprises a filter of the second detection signal and a filter of the first detection signal, with the filter of the second signal being a filter with a band-pass less than that of a filter of the first signal to have a close or identical resolution on the first detection signal and the second detection signal.

12. A gyroscope according to claim 1, wherein the instrumentation amplifier is configured to amplify the first and the second detection signals and includes a first demodulator configured to demodulate the amplified signals; and
    further comprising a phase shifter configured to shift the second detection signal to reproduce a shifting of the detection oscillator, where the shifting is applied before the demodulation of the second detection signal by the first demodulator.

13. A gyroscope according to claim 1, having excitation and detection frequencies that are not tuned.

14. A gyroscope according to claim 1, wherein the excitation mass is suspended with respect to the substrate by at least one spring having a first spring constant according to the direction of detection and a second spring constant according to the excitation direction, with the first spring constant being substantially greater than the second spring constant.

15. A gyroscope according to claim 14, wherein the ratio of the first spring constant over the second spring constant is greater than 100.

16. A gyroscope according to claim 1, further comprising a connector upstream of the instrumentation amplifier to periodically determine the at least one calibration parameter of the gyroscope.

17. A gyroscope according to claim 1, comprising plural coupled excitation masses, the masses being configured to move in different directions.

18. A method for calibrating a gyroscope including at least one excitation oscillator including at least one excitation mass having a single direction of excitation movement, and at least one detection oscillator including at least one detection mass configured to n ove according to art excitation direction and according to a detection direction, comprising:
    a) measuring movement of the detection mass in the detection direction, (brining a first detection signal;
    b) measuring movement of the excitation mass according to the direction of detection, forming a second detection signal;
    C) processing the first detection signal and the second detection signal to determine a rotation speed that the gyroscope is subjected to and to supply at least one calibration parameter of the gyroscope;

d) calibrating the gyroscope based the parameter.

19. A method for calibrating according to claim 18, wherein the c) processing the first and the second signal comprises:

c1) processing the first detection signal to obtain quadrature bias and the sum of phase bias and rotation speed;

c2) processing the second detection signal to obtain the ratio of the phase bias over an amplification coefficient and the ratio of the quadrature bias over the amplification coefficient; and c3) determining the amplification coefficient by carrying out a division of the quadrature bias on the ratio of the quadrature bias over the amplification coefficient.

20. A method for calibrating according to claim 18, wherein the a) measuring comprises:

a1) amplifying and filtering the first detection signal; and a2) demodulating the first amplified signal; and the b) measuring comprises:

b1) amplifying and filtering the second detection signal; and b2) demodulating the second amplified signal.

21. A method for calibrating according to claim 20, further comprising demodulating and filtering between the a1) and a2) and between the b1) and b2) to bring the first and second amplified signals to an actuating frequency.

22. A method for calibrating according to claim 20, wherein, in cases of capacitive detection signals, a2) and b2) are carried out by a stage of capacitive reading.

23. A method for calibrating according to claim 20, wherein, in cases of piezoresistive detection signals, a2) and b2) are carried out by one or plural amplifiers with differential inputs.

24. A method for calibrating according to claim 18, implemented continuously or periodically or selectively following a variation in an environment of the gyroscope.

* * * * *